Patented May 4, 1948

2,441,022

UNITED STATES PATENT OFFICE 2,441,022

DRYING ALUM

Albert W. Kingsbury, Moorestown, N. J., and William H. Osborn, New York, N. Y., assignors to Phelps Dodge Corporation, New York, N. Y., a corporation of New York No Drawing. Application July 12, 1943, Serial No. 494,356

6 Claims. (Cl. 23—118)

This invention relates to the dehydration of inorganic salts containing water of crystallization and more particularly to the preparation of dehydrated potash alum.

Normal potash alum is a combination of potassium and aluminum sulfates having the chemical formula $K_2SO_4.Al_2(SO_4)_3.24H_2O$. It melts in its own water of hydration at approximately 92° C. and the water of hydration may be driven off at temperatures below 400° C., leaving the anhydrous salt. However, as the water is expelled from the material, its boiling point rises progressively and the material at the same time becomes more and more pasty. When around 35% of the original moisture has been driven off, the mass becomes so pasty that it begins to be filled with air pockets and puffs or swells up so that by the time it is fully dehydrated, the product is a loose, puffy material that is very friable and has an apparent density as low as 0.2.

This friable fluffy material is very difficult to handle in subsequent operations requiring the use of dehydrated alum and, consequently, many attempts have been made to provide a dehydrated product having more desirable physical properties. The drying of hydrated alum at temperatures below its melting point by means of a current of warm air or under a partial vacuum has been proposed. If extreme care is used, the material may be dried in this manner without fusion but this treatment requires a long heating, expensive apparatus, the use of large volumes of hot air, etc. Attempts have also been made to melt the hydrated alum and spray dry it by spraying the molten alum into a column of rising warm air. Here again, however, complicated apparatus is required, the process is expensive to operate and a difficult problem is posed in the handling of the material at its different stages.

An object of this invention is to provide a simple economical process for dehydrating inorganic salts such as potash alum that contain substantial quantities of water of crystallization.

Another object is to dry potash alum in a simple practical manner to obtain a product that is physically strong, slightly porous but of relatively high apparent density.

A further object is to provide an economical method of drying potash alum, either alone or containing added ingredients, by seeding the alum during the drying process with dehydrated alum.

Other objects will be apparent or will be explained in connection with the following description of the invention.

Partially dehydrated potash alum may exist as a stable or as a meta-stable form, or a mixture of both forms. The dehydration of the molten alum produces first the meta-stable form which in turn is gradually converted to the stable form, although considerable dehydration may take place without any conversion to the stable form.

The meta-stable form is characterized by relatively high viscosity and low vapor pressure at any given temperature compared with the stable form. For this reason, the stable form is more readily dehydrated than the meta-stable in the liquid state.

We have found that dehydration of potash alum proceeds satisfactorily when its rate does not exceed the rate of transformation of the meta-stable to the stable form, and that this transformation rate varies with the amount of stable form which is present in the mixture. Thus, by forming sufficient stable form alum in a mixture, or by adding the stable form to the mixture, it is possible to dehydrate potash alum rapidly without producing an undesirably light product.

For example, we have found that dehydrated potash alum in a form suitable for handling in large scale apparatus can be produced by adding crushed dehydrated alum to the alum that is being dehydrated. The recycling or reuse of dehydrated alum not only assists the drying process by lowering the average moisure content, but makes it possible by reason of the "inoculation" with the stable form to keep the melt quite fluid throughout the first part of the drying process and overcomes the objectionable spewing or swelling of the charge that occurs when no recycling is employed.

A charge may be heated rapidly by this process and still remain fluid until the point of actual solidification. Continued heating of the solidified cake dries out the mass without further fusing, and leaves a product that has good mechanical strength but sufficient porosity to give it an apparent density of about 1.0.

The dehydrated alum that is re-cycled may be added to an original mass of hydrous crystals or it may be added to a molten bath or hydrated alum while dehydration is progressing, provided the dehydrated product is added before the alum being dried increases substantially in volume by reason of swelling. In other words, the dehydrated alum should be added before the hydrated material has lost more than about 35% of its original water content. For most purposes, it is convenient to melt the hydrous alum crystals and immediately add dehydrated alum to the melt.

The proportion of dehydrated alum that is added does not have to be large and may be varied within rather wide limits. Some benefit due to seeding with stable form alum is obtained if the amount added is only a small fraction of 1% of the hydrated alum. For the best control of the process of drying, however, we have found that at least one part of dehydrated alum should be added to about 100 parts of hydrous alum, by weight. One part of dehydrated alum to 9 parts of hydrated alum by weight is sufficient to avoid any substantial puffing or swelling of the charge, although larger proportions of the dehydrated alum may be recycled if desired.

The process can be carried out in a suitable open pot or kettle by simply adding the required amount of dehydrated alum at the appropriate time and continuing the heating of the mass until after a solidified cake is formed and the cake is dried to the requisite degree. In large kettles, however, the rate of heat transfer through the partially dehydrated alum mass is very slow and consequently it is difficult to complete in a short time the drying of the central portion of the mass under these conditions.

Another procedure that may be used according to our invention is the formation of sufficient stable form alum by melting and partially dehydrating the alum crystals after addition of small quantities of stable "seeds," and then casting out the material while it is still liquid. In this case, dehydrated alum may be added to the material being dried only in small quantities, and dehydration of the cast material is completed while it is in the solid state.

The alum is preferably dehydrated in the liquid stage to approximately 70% of its original moisture content before it is cast, so that the melting point of the cast product is sufficiently high to permit fairly rapid drying of the solid material without producing fusion.

The formation of a partially dehydrated mass suitable for casting may be carried out by simply melting the hydrous alum crystals in their water of crystallization, adding small quantities of stable form "seeds," and boiling the liquid formed until about 30% of its original moisture content is driven off. Another way of accomplishing this result is to melt a quantity of hydrated alum and add to it sufficient dehydrated alum to produce a mixture containing approximately 70% of the normal amount of water. This procedure obviates the necessity for boiling large quantities of the hydrated alum and at the same time, of course, increases the proportion of stable form alum in the mixture.

This part of the process, of course, may be carried out either intermittently by preparing successive batches, or continuously by forming a pot of molten alum containing sufficient dehydrated alum to lower its moisture content substantially, drawing off a continuous stream of the partially dehydrated alum for casting and simultaneously adding to the pot at another point a stream of freshly melted hydrated alum.

The molten partially dehydrated alum is preferably cast in shallow pan molds or other suitable molds, allowed to cool and then broken up into particles of a suitable size for convenient handling. The crushed alum may then be completely dehydrated or dried to any suitable water content without fusion of the material by passing it through a conventional rotary drying kiln or other suitable type of furnace.

In order to dry the solid partially dehydrated alum satisfactorily, the temperature within the mass should not exceed the melting point of the material. Heat is transferred inwardly into the particles by conduction and consumed both as sensible heat to raise the temperature of the particles and as latent heat to evaporate some of the water. The water vapor formed must be moved outwardly through the particles by diffusion. It is necessary, therefore, if the material is to be dried without fusion, to reach a thermal equilibrium at which the rate of heat consumption by vaporization of moisture equals the inward rate of heat transfer by conduction.

The particular temperature at which this equilibrium is reached will, of course, vary with different factors such as porosity, melting point and vapor pressure. The porosity of the material aids in diffusing the water vapor outwardly and reduces the heat transfer by conduction. Thus, a fairly porous solid material can be subjected to a higher external furnace temperature without fusion than a less porous product. The melting point of the material is also a determining factor which limits the external furnace temperature that can be used.

The melting point is only slightly affected by seeding with stable form alum until the dehydrated phase becomes very high in relation to the liquefiable alum phase. The porosity and vapor pressure, however, are greatly affected when the ratio of anhydrous seed to alum is 23.2 to 100 or more, and this seed alum is intimately dispersed.

As an example of the drying of partially dehydrated potash alum in the solid state, we have found that the cast material containing about 65 to 70% of its original water of crystallization can be crushed to a maximum size of one inch and passed through a rotary kiln to remove most of the remaining moisture. In the kiln 8 feet long and 15 inches internal diameter, the crushed alum containing 70% of its original moisture can be dried to a moisture content of 6% or less at the rate of 50 lbs. per hour, introducing hot gases at the discharge end of the kiln heated to approximately 1350° F. In this case, the exit gases from the kiln were at a temperature of around 500° F. and in spite of the high temperature of the drying gases, the crushed alum did not fuse noticeably.

If desired, various other ingredients may be added to the molten alum during the drying to assist in the drying operation, or for use in subsequent treatments of the dehydrated alum. For example, finely divided carbon or carbonaceous material may be intimately dispersed in the alum by adding it to the molten alum before casting. This addition is useful if the dehydrated alum is to be calcined as described and claimed in the copending application of Tuwiner and Osborn, Serial No. 476,634, filed February 20, 1943, now Patent No. 2,402,471, issued June 18, 1946.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of dehydrating potassium alum which comprises adding anhydrous alum to a melt of hydrated alum and heating the melted mixture at such a rate as to effect evaporation 1. ...to convert substantially completely the hydrated alum to anhydrous alum smoothly and without intumescence.

2. A process of dehydrating potassium alum which comprises melting hydrated alum, adding at least 1% by weight of anhydrous alum to the melted mass and heating the melted mixture at such a rate as to effect evaporation to convert substantially completely the hydrated alum to anhydrous alum smoothly and without intumescence.

3. A process of dehydrating potassium alum which comprises melting hydrated alum, adding at least one part of dehydrated alum to each nine parts of hydrous alum in the melt and heating the melted mixture at such a rate as to effect evaporation to convert substantially completely the hydrated alum to anhydrous alum smoothly and without intumescence.

4. A process of dehydrating potassium alum which comprises melting hydrated alum, adding anhydrous alum to the melted hydrated alum, casting the mixture while the mixture is in a liquid state and heating the cast material at such a rate as to effect evaporation to convert substantially completely the hydrated alum to anhydrous alum smoothly and without intumescence.

5. A process of dehydrating potassium alum which comprises melting hydrated alum, adding anhydrous alum to the melt, heating the mixture formed until not more than 35% of the original moisture content of the hydrated alum is driven off, casting the mixture and heating the resulting cast material at such a rate as to effect evaporation to convert substantially completely the hydrous alum to anhydrous alum smoothly and without intumescence.

6. A process of dehydrating potassium alum which comprises, melting hydrated alum, adding anhydrous alum to the melted mass, heating the mixture until approximately 30% of the original moisture content is driven off, casting the mixture and heating the resulting cast material at such a rate as to effect evaporation to convert substantially completely the hydrated alum to anhydrous alum smoothly and without intumescence.

ALBERT W. KINGSBURY.
WILLIAM H. OSBORN.

REFERENCES CITED

The following references are of record in the file of this patent:

UNITED STATES PATENTS

| Number | Name | Date |
|--------|------|------|
| 301,174 | Spencer | July 1, 1884 |
| 1,886,580 | Pierce | Nov. 8, 1932 |
| 2,119,551 | MacCarthy | June 7, 1938 |
| 2,214,214 | Walthall | Sept. 10, 1940 |
| 2,304,133 | Wilson | Dec. 8, 1942 |
| 2,304,519 | Wilson | Dec. 8, 1942 |